United States Patent
Budaker et al.

(10) Patent No.: US 6,830,267 B2
(45) Date of Patent: Dec. 14, 2004

(54) ADJUSTABLE STEERING COLUMN

(75) Inventors: Martin Budaker, Heubach (DE); Gerhard Seitz, Schwäbisch Gmünd-Rechberg (DE)

(73) Assignee: ZF Lenksysteme GmbH, Schwäbisch Gmünd (DE)

( * ) Notice: Subject to any disclaimer, the term of this patent is extended or adjusted under 35 U.S.C. 154(b) by 110 days.

(21) Appl. No.: 10/056,750

(22) Filed: Jan. 25, 2002

(65) Prior Publication Data

US 2003/0094802 A1 May 22, 2003

(30) Foreign Application Priority Data

Nov. 19, 2001 (DE) .......................................... 101 56 327

(51) Int. Cl.[7] .................................................. B62D 1/18
(52) U.S. Cl. .......................................... 280/775; 74/493
(58) Field of Search ............................ 280/775; 74/493, 74/492

(56) References Cited

U.S. PATENT DOCUMENTS

| | | | | |
|---|---|---|---|---|
| 3,799,569 A | * | 3/1974 | Baker ........................ 280/775 |
| 4,753,121 A | * | 6/1988 | Venable et al. ............... 74/493 |
| 4,776,189 A | * | 10/1988 | Weber et al. .................. 70/182 |
| 4,788,880 A | * | 12/1988 | Kester .......................... 74/493 |
| 5,035,446 A | * | 7/1991 | Arvidsson ................... 280/775 |
| 5,048,364 A | * | 9/1991 | Minamoto et al. ............ 74/493 |
| 5,242,195 A | * | 9/1993 | Wendling .................... 280/777 |
| 5,626,059 A | * | 5/1997 | Bobbitt et al. ................. 74/493 |
| 6,131,481 A | * | 10/2000 | Wilson et al. ................. 74/493 |
| 6,138,525 A | * | 10/2000 | Riefe et al. ................... 74/493 |
| 6,666,478 B2 | * | 12/2003 | Livengood .................. 280/775 |
| 2003/0094061 A1 | * | 5/2003 | Cartwright et al. ........... 74/493 |

FOREIGN PATENT DOCUMENTS

| | | | |
|---|---|---|---|
| CH | 647 469 | * | 1/1985 |
| DE | 195 45 438 | | 6/1997 |
| GB | 2 092 966 | * | 8/1982 |
| JP | 7-257402 | * | 10/1995 |
| JP | 10-129503 | * | 5/1998 |

* cited by examiner

*Primary Examiner*—Paul N. Dickson
*Assistant Examiner*—George D. Spisich
(74) *Attorney, Agent, or Firm*—Kenyon & Kenyon

(57) ABSTRACT

An adjustable steering column having two locating couplings which are arranged opposite one another and have, in each case, two coupling parts able to be brought in contact, a pressure element being arranged between the mutually corresponding, medial coupling parts belonging to different couplings, while the two other outer coupling parts are interconnected by a tension element. A sturdy, cost-effective, functionally reliable retention of the couplings is attained, in that; the pressure element is a bending spring which, with mutually opposite ends in an expanded state, pushes the medial coupling parts away from each other and in the direction of the appertaining outer coupling parts, while in a compressed state, the distance between the ends is shortened by bending; and engaging between the ends is an actuating device by which, on the one hand, the bending is able to be produced for releasing the coupling, and on the other hand, the coupling of the locating coupling is able to be produced by reducing the bending.

10 Claims, 3 Drawing Sheets

ADJUSTABLE STEERING COLUMN

FIELD OF THE INVENTION

The present invention relates to an adjustable steering column.

BACKGROUND INFORMATION

A steering column is generally fixed mechanically (jammed) in the position desired by the driver via a worm gear, via rocker arms or according to the principle of the inclined plane (wedge effect). Disadvantageous in this context is that the clamping force must be applied manually. As a result, it is highly specific to the person, so that clamping reliability is only partially fulfilled. Furthermore, the arresting device can loosen during travel operation due to settling of the components.

In the case of pneumatic actuation, the clamping force is generated by a compression spring or disk spring and is intensified via levers or according to the principle of the inclined plane.

To release the clamping force/arresting, the prestress force of the compression or disk spring is offset by way of a piston actuated by compressed air (compressed air cylinder).

Disadvantages of such steering columns include the high number of parts and the cost.

SUMMARY

An example embodiment of an adjustable steering device according to the present invention may provide the following advantage: It includes a sturdy, inexpensive and functionally reliable arresting device for actuation by hand or pneumatically or electromagnetically, particularly electromotively.

DETAILED DESCRIPTION

Figure 1:
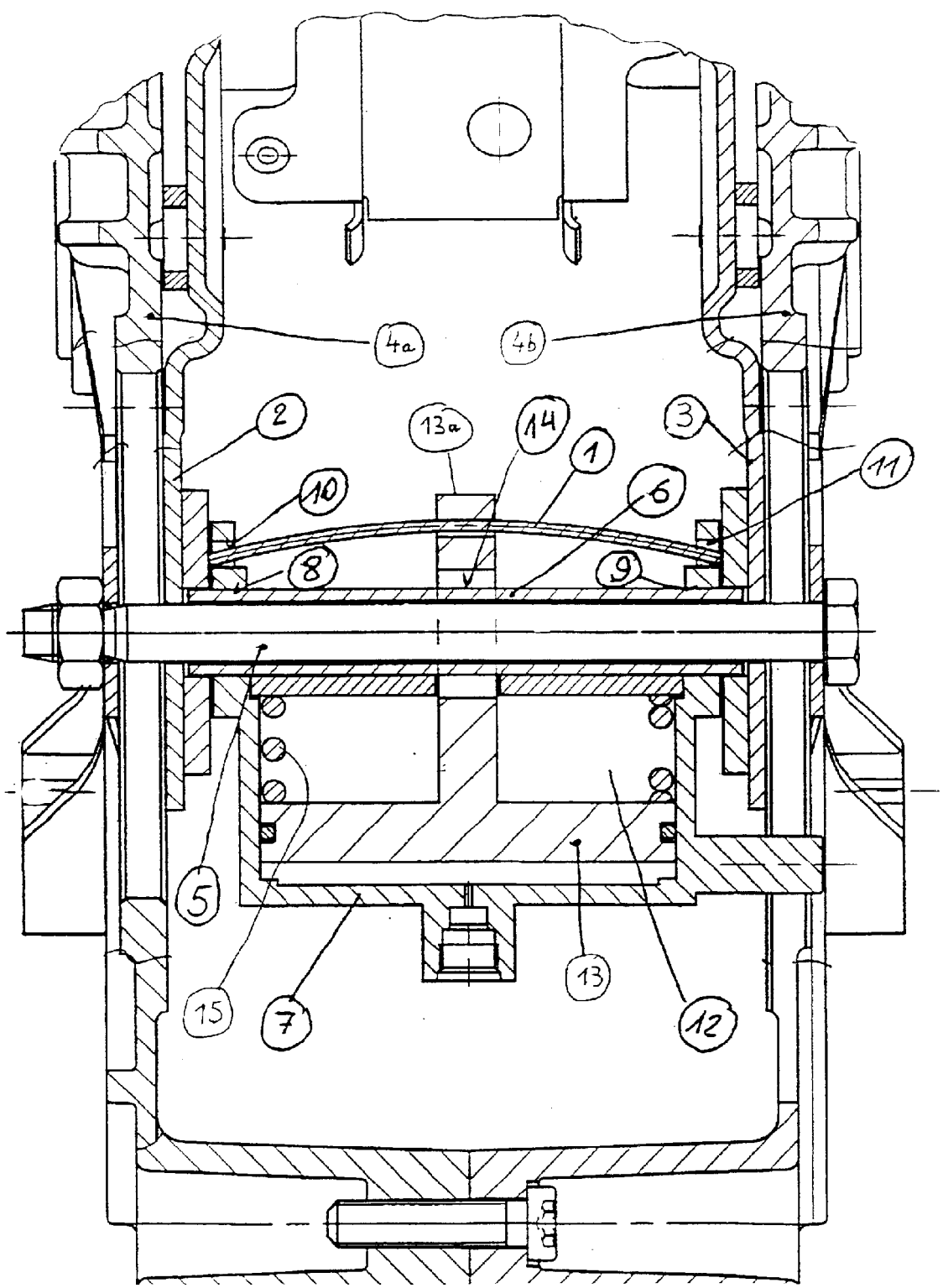
FIG. 1 schematically illustrates a bearing block having guide plates of a guide part for an adjustable steering column according to the present invention.

Identical parts in different figures are provided with identical reference numerals.

In FIG. 1, located between side parts 4a, 4b of a bearing block, which is boltable to a driver's cab, are guide plates 2, 3 of a guide part, with the aid of which a section of a steering column is able to be guided. Side part 4a, together with guide plate 2, forms a first locating or arresting coupling. Side part 4b, together with guide plate 3, forms a further locating coupling. The two locating couplings are opposite one another. Arranged between the two medial coupling parts 2, 3, which correspond to one another and belong to different locating couplings, is a bending spring or a leaf spring 1 as a pressure element prestressed to the point of buckling. This is used as a source of force for a clamping force as is needed for closing the locating coupling.

Leaf spring 1 braces guide plates 2 and 3 against side parts 4a and 4b of the bearing block, which form the respective outer coupling parts of the two locating couplings.

These two mutually corresponding outer coupling parts 4a, 4b are interconnected by a tension element, e.g., by a threaded member 5 which is used to support the clamping force (spreading force) generated by leaf spring 1. This permits a less stable, and thus cost-effective configuration of the bearing block.

Threaded member 5 is used as mounting for a guide tube 6 and (via guide tube 6) for a pneumatic cylinder housing 7 of a compressed air cylinder 12. Cylinder housing 7 is configured such that it accommodates guide tube 6 in bore holes 8, 9, and the ends of leaf spring 1 in elongated holes 10, 11.

If fluid, e.g., compressed air, acts upon compressed air cylinder 12, then, as FIG. 1 illustrates, a piston 13, via its piston rod 13a, deflects leaf spring 1. The effective length of the leaf spring is thereby shortened ("compressed state" of the leaf spring), and the arresting by the locating couplings is canceled—guide parts 2, 3 for the steering column are able to be adjusted.

If the pressure in compressed air cylinder 12 is reduced, then leaf spring 1 springs back into its released position ("expanded state" of the leaf spring), and the guide part for the steering column is again located in position by the locating couplings.

The clamping force of leaf spring 1 may be intensified by an additional spring (compression spring 15), so that leaf spring 1 may be dimensioned to have weaker power.

A further advantage of compression spring 15 is that in the clamping position, all components are braced against each other by the compression spring, and thus no rattles occur during travel operation. A stop 14 ensures that the leaf spring does not buckle into the opposite direction.

Figure 2:
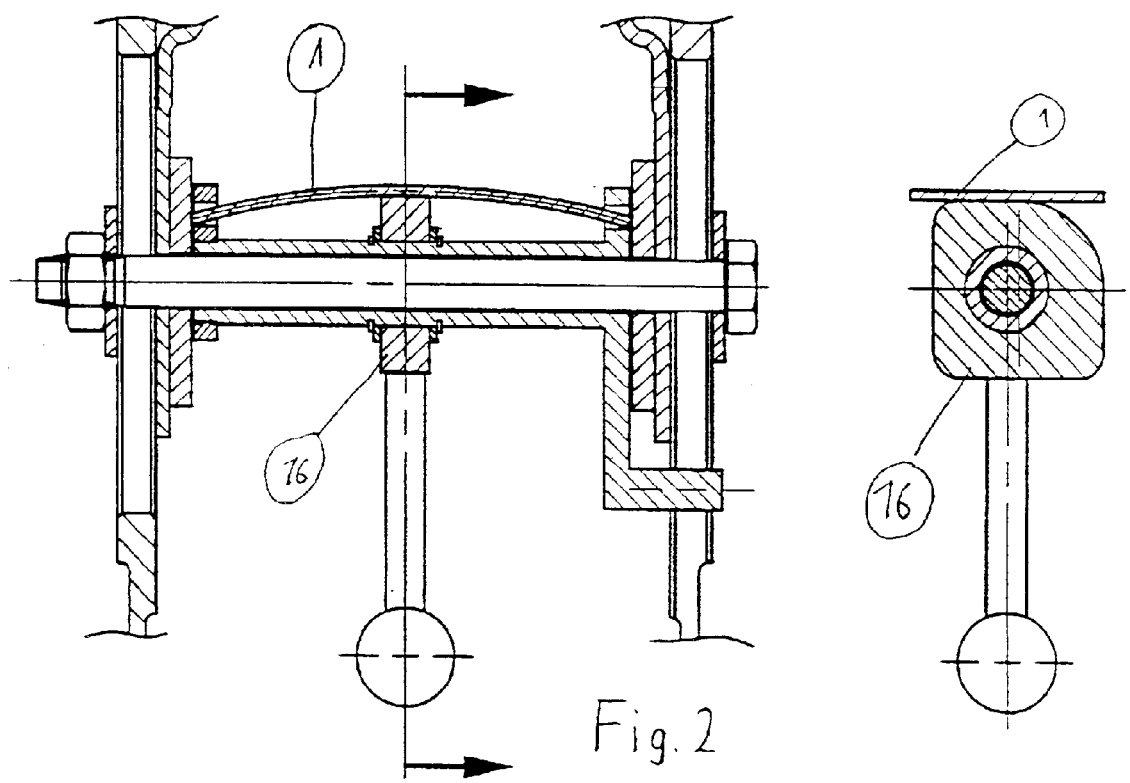
FIG. 2 schematically illustrates a modified segment from FIG. 1.

FIG. 2 illustrates a possible design approach for a manually actuated retention. Leaf spring 1 is also used as pressure and clamping element.

The retention is released via an eccentric lever 16: Upon actuation of the eccentric lever, the leaf spring is deflected in a conventional manner.

Figure 3:
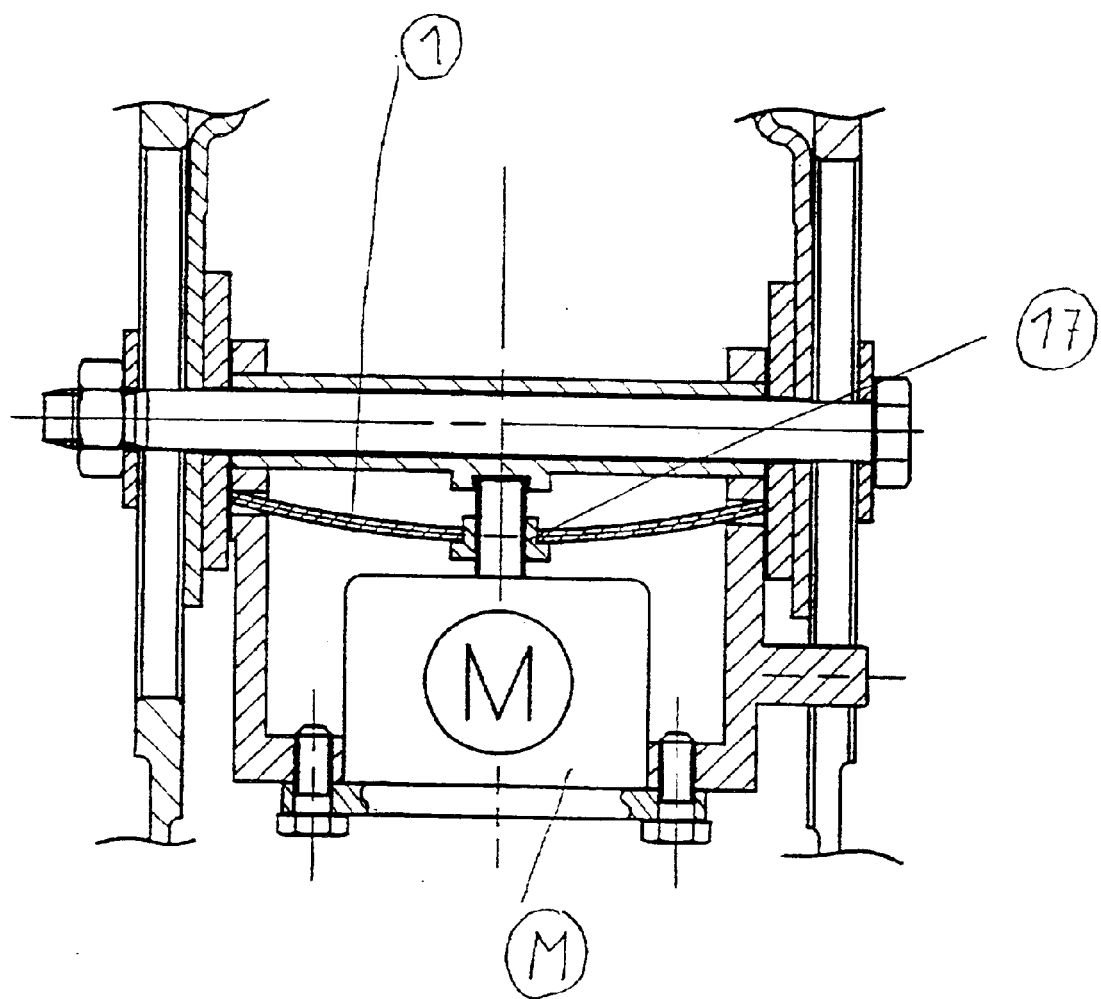
FIG. 3 schematically illustrates a further modification.

FIG. 3 illustrates a possible electromotive design approach. An E-motor M actuates leaf spring 1 in a conventional manner via a worm gear 17.

What is claimed is:

1. An adjustable steering column, comprising:
    a first locating coupling and a second locating coupling, the first locating coupling and the second locating coupling arranged opposite one another, each of the first locating coupling and the second locating coupling including two coupling parts configured to be brought into contact with one another;
    a pressure element arranged between two mutually corresponding, medial ones of the coupling parts of the first locating coupling and the second locating coupling; and
    a tension element interconnecting two outer mutually corresponding ones of the coupling parts of the first locating coupling and the second locating coupling;
    wherein the pressure element includes a bending spring configured, with mutually opposite ends in an expanded state, to push the medial coupling parts away from each other and in the direction of the outer coupling parts and, while in a compressed state, the distance between the ends is configured to be shortened by bending; and
    wherein engaging between the ends is an actuating device configured to produce bending of the bending spring for releasing the locating coupling and to produce coupling of the locating coupling by reducing the bending.

2. The adjustable steering column according to claim 1, wherein the actuating device is configured to be put in motion by a fluid.

3. The adjustable steering column according to claim 1, wherein the actuating device is configured to be put in motion electromagnetically.

4. The adjustable steering column according to claim 1, wherein in the released state, the bending spring is configured to assume its expanded state.

5. The adjustable steering column according to claim 1, further comprising a further spring configured to force the bending spring into the expanded state.

6. An adjustable steering column, comprising:

a first locating coupling and a second locating coupling, the first locating coupling and the second locating coupling arranged opposite one another, each of the first locating coupling and the second locating coupling including two coupling parts configured to be brought into contact with one another;

a pressure element arranged between two mutually corresponding, medial ones of the coupling parts of the first locating coupling and the second locating coupling; and a tension element interconnecting two outer mutually corresponding ones of the coupling parts of the first locating coupling and the second locating coupling;

wherein the pressure element includes a leaf spring configured, with mutually opposite ends in an expanded state, to push the medial coupling parts away from each other and in the direction of the outer coupling parts and, while in a compressed state, the distance between the ends is configured to be shortened by bending; and wherein engaging between the ends is an actuating device configured to produce bending of the leaf spring for releasing the locating coupling and to produce coupling of the locating coupling by reducing the bending.

7. The adjustable steering column according to claim 6, wherein the actuating device is configured to be put in motion by a fluid.

8. The adjustable steering column according to claim wherein the actuating device is configured to be put in motion electromagnetically.

9. The adjustable steering column according to claim 6, wherein in the released state, the leaf spring is configured to assume its expanded state.

10. The adjustable steering column according to claim 6, further comprising a further spring configured to force the leaf spring into the expanded state.

* * * * *

UNITED STATES PATENT AND TRADEMARK OFFICE
CERTIFICATE OF CORRECTION

PATENT NO. : 6,830,267 B2
DATED : December 14, 2004
INVENTOR(S) : Budaker et al.

It is certified that error appears in the above-identified patent and that said Letters Patent is hereby corrected as shown below:

<u>Column 4,</u>
Line 17, change "according to claim" to -- according to claim 6 --.

Signed and Sealed this

Sixteenth Day of August, 2005

JON W. DUDAS
*Director of the United States Patent and Trademark Office*